June 13, 1972     S. J. DE ANGELIS     3,669,533

CAMERA DEVICE

Filed May 6, 1971

INVENTOR.
SABINO J. DeANGELIS

United States Patent Office 3,669,533
Patented June 13, 1972

3,669,533
CAMERA DEVICE
Sabino J. De Angelis, 87—03 235th Court,
Bellerose, N.Y. 11427
Filed May 6, 1971, Ser. No. 140,777
Int. Cl. G03b *19/18*
U.S. Cl. 352—95                                           3 Claims

ABSTRACT OF THE DISCLOSURE

A device for a motion picture camera, having a trigger with a flexible rod which will alternately make contact with electrical contacts so as to change the camera to shoot for wide angle, single frame or telephoto. The device also includes spring return means for the trigger rod.

---

This invention relates to motion picture cameras, and more particularly to a camera device which will enable the user to utilize a finger to change from a regular setting to the telephoto setting, single frame setting and the like.

It is therefore the primary purpose of this invention to provide a camera device which will include a trigger member having a rod and contact means for engaging one of a plurality of pairs of contacts which will control the setting of the camera with the use of the camera operator's finger while the user is holding the pistol grip of the camera.

Another object of this invention is to provide a device of the type described which will include a flexible rod member which will automatically return the rod by spring means within a cylinder of the device after pressure is released from the trigger portion.

Another object of this invention is to provide a device of the type described which will have the trigger of such construction so as to prevent rotation thereof when device is being used.

A further object of this invention is to provide a camera device which will be adaptable for use with various motion picture cameras and the device will eliminate the prior art of having separate buttons for wide angle, telephoto and the like.

Other objects of the present invention are to provide a camera device which is simple in design, inexpensive to manufacture, rugged in construction, easy to use and efficient in operation.

These and other objects will be readily evident upon a study of the following specification and the accompanying drawing wherein.

Figure 1:
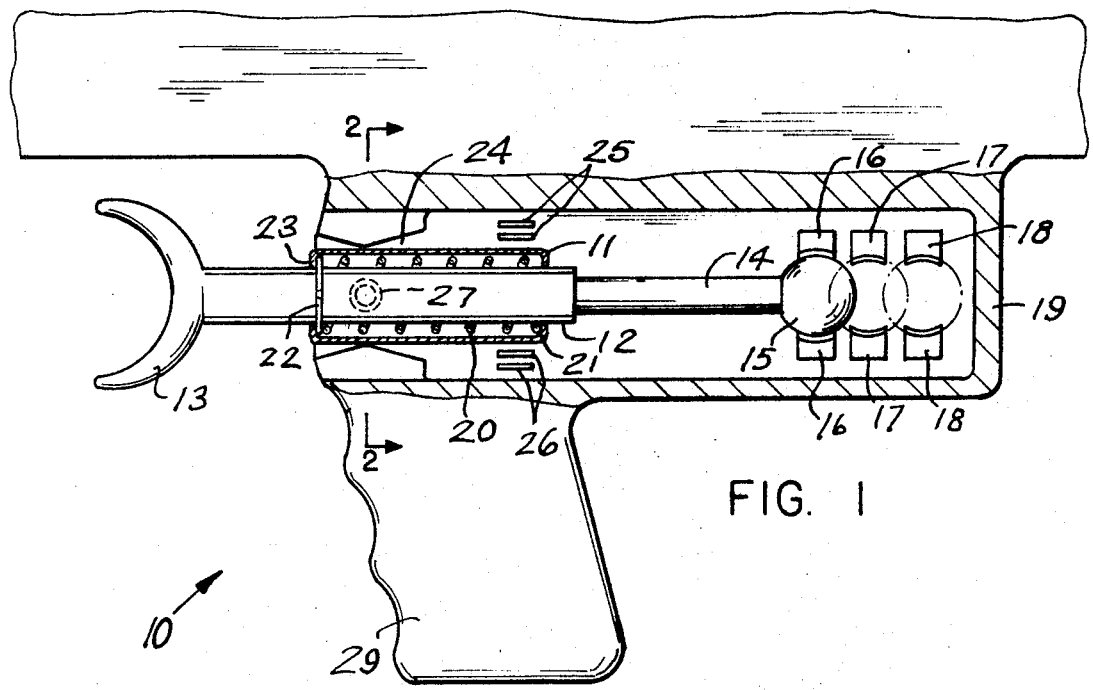
FIG. 1 is a side view of the present invention shown installed within a motion picture camera housing, the device shown partly in section.
Figure 2:
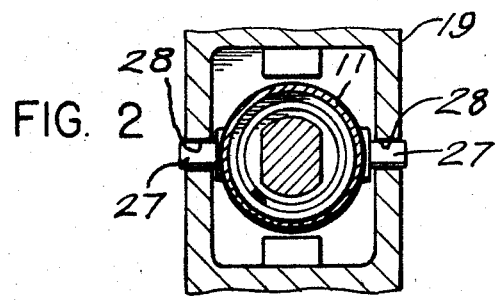
FIG. 2 is a cross-sectional view taken along the line 2—2 of FIG. 1.

According to this invention, a camera device 10 is shown to include a cylindrical barrel 11 in which is slideable a rod 12 having a crescent-shaped finger hold member 13 for properly positioning the user's finger thereon.

Rod 12 is provided with a flexible end portion 14 having fixedly secured thereto a metallic ball 15 which is used to engage any pair of spaced apart electrical contacts 16, 17, and 18 within the camera housing 19.

Encompassing rod 12 on the interior of barrel 11 is a coil spring 20 which serves as return means for rod 12 to its full forward position. Spring 20 urges against end wall 21 of barrel 11 at one end and urges against washer 22 at another end, the washer 22 being fixedly secured to rod 12 and end wall 23 of barrel 11 serves as stop means for the forward position of rod 12 when pressure is released from the finger hold 13.

Figure 3:
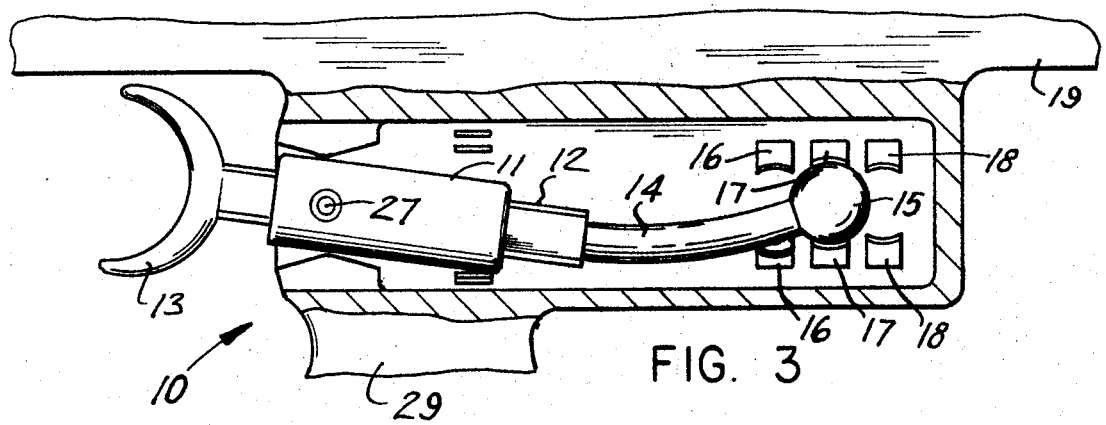
FIG. 3 is similar to FIG. 1, but showing an alternate operating position.

Barrel 11 is positioned within aperture 24 of camera housing 19 and when an alternate position is assumed by and force to finger hold member 13, either set of contacts 25 and 26 will be closed as shown in FIG. 3 of the drawing.

Fixedly secured to and outwardly projecting therefrom barrel 11 are pins 27 which are slideable within an elongated opening 28 on either side of camera housing 19, the arrangement serving to prevent rotation of the device 10 when in use.

The cameraman grips the pistol grip 29 in a well known manner and engages the forefinger of one hand with the crescent shaped finger hold member 13 and by applying a squeezing pressure may alternately engage the contacts 16, 17, or 18 with the ball member 15 of the flexible end 14 of rod 12 and in doing so the cameraman selectively causes the camera to be set to telephoto, wide angle or the like due to each of the pairs of contacts 16, 17, and 18 being connected so as to perform its specific function of switching and by pressure being applied angularly as shown, alternate contacts 25 and 26 may be closed by the barrel 11 engaging contact 25 or 26.

What I claim is:

1. A camera device for changing the switch operated camera settings, comprising a trigger and rod member, a contact ball carried by said trigger and rod, a plurality of pairs of switch contacts carried by said assembly, a barrel member carried by said assembly providing guide means for said rod, spring return means carried by said assembly for returning said rod to its full forward position after use, guide pin means carried by said device for preventing the rotation thereof, washer means carried by said rod serving as stop means against one end of said barrel of said assembly.

2. The combination according to claim 1, wherein said barrel of said assembly is carried within an aperture of the camera housing and said rod is slideable within said barrel so as to allow the flexible end having said metallic ball, to engage one of a pair of contacts in alignment with each other in tiers on the interior of said camera housing, and said spring encompasses said rod on the interior of said barrel, one end of said spring urging against one end wall of said barrel and the other end of said spring urging against a washer secured fixedly to said rod and said washer abuts with the opposite end wall of said barrel when pressure is released on the finger hold member of said assembly and thus said end wall of said barrel provides stop means for said rod through said washer abutting therewith when pressure is released from finger hold member of said rod.

3. The combination according to claim 2, wherein said barrel of said assembly of said device has projecting from it in an oppositely opposed manner a pin on either side, said pins each being freely and slideably received within elongated slots on the sides of said camera housing, said pins serving as guide means and anti-rotation means for said rod of said device and said rod is oscillatable between any spaced apart pair of contacts arranged in tiers of said housing and is returnable by said spring means within said barrel when pressure is released from said finger hold member and said rod end is flexible so as to enable the user to angularly apply pressure to said finger hold member in order to cause said barrel to engage one of a pair of electrical contacts on opposite sides of said barrel member thus effecting the closing of a circuit other than those said pairs of contacts in said housing affected by the use of said ball being engaged therewith and said barrel of said assembly may be angularly disposed within said camera housing by a double conical aperture in the forward end of said camera housing from which said finger hold member extends and serves as trigger means for switching said camera to various shooting selections, such as wide angle, single frame, telephoto and the like.

References Cited

UNITED STATES PATENTS

| | | | |
|---|---|---|---|
| 3,101,035 | 8/1963 | Williams | 352—178 X |
| 3,301,627 | 1/1967 | Kimura | 352—243 X |
| 3,187,341 | 6/1965 | Kubota | 352—243 X |
| 3,397,937 | 8/1968 | Schrader | 352—169 |

SAMUEL S. MATTHEWS, Primary Examiner

M. H. HAYES, Assistant Examiner

U.S. Cl. X.R.

200—157; 352—169